(12) United States Patent
Liu et al.

(10) Patent No.: US 11,575,903 B2
(45) Date of Patent: Feb. 7, 2023

(54) 8-PARAMETER AFFINE MODE

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

(*) Notice: Subject to any disclaimer, the term of this patent is extended or adjusted under 35 U.S.C. 154(b) by 0 days.

(21) Appl. No.: 17/207,118

(22) Filed: Mar. 19, 2021

(65) Prior Publication Data

US 2021/0211677 A1 Jul. 8, 2021

Related U.S. Application Data

(63) Continuation of application No. PCT/IB2019/058022, filed on Sep. 23, 2019.

(51) Int. Cl.
*H04N 19/137* (2014.01)
*H04N 19/105* (2014.01)
*H04N 19/176* (2014.01)
*H04N 19/513* (2014.01)
*H04N 19/30* (2014.01)
*H04N 19/503* (2014.01)

(52) U.S. Cl.
CPC ......... *H04N 19/137* (2014.11); *H04N 19/105* (2014.11); *H04N 19/176* (2014.11); *H04N 19/30* (2014.11); *H04N 19/503* (2014.11); *H04N 19/513* (2014.11)

(58) Field of Classification Search
None
See application file for complete search history.

(56) References Cited

U.S. PATENT DOCUMENTS

| 8,107,539 B2 | 1/2012 | Hannuksela et al. |
| 9,031,129 B2 | 5/2015 | Xu et al. |

(Continued)

FOREIGN PATENT DOCUMENTS

| CN | 104137547 A | 11/2014 |
| CN | 105163116 A | 12/2015 |

(Continued)

OTHER PUBLICATIONS

Bross et al. "Inter-Picture Prediction in HEVC," In: Vivian Sze et al. "High Efficiency Video Coding (HEVC)," Aug. 23, 2014, Springer International Publishing, pp. 113-140.

(Continued)

*Primary Examiner* — Christopher G Findley
(74) *Attorney, Agent, or Firm* — Perkins Coie LLP

(57) ABSTRACT

A method of video processing includes deriving, for a current block, a set of control point motion vectors; determining a motion prediction model for the current block based on the set of CPMVs; and performing a conversion between the current block and a bitstream representation of the current block using the motion prediction model, the motion prediction model being a 8-parameter affine prediction model.

20 Claims, 13 Drawing Sheets

(56) References Cited

U.S. PATENT DOCUMENTS

| | | | |
|---|---|---|---|
| 9,571,809 | B2 | 2/2017 | Deng et al. |
| 10,448,010 | B2 | 10/2019 | Chen et al. |
| 10,560,712 | B2 | 2/2020 | Zou et al. |
| 10,757,417 | B2 | 8/2020 | Zhang et al. |
| 10,778,999 | B2 | 9/2020 | Li et al. |
| 10,841,609 | B1 | 11/2020 | Liu et al. |
| 11,051,010 | B2 | 6/2021 | Chiang et al. |
| 11,057,636 | B2 | 7/2021 | Huang et al. |
| 11,128,887 | B2 | 9/2021 | Lee |
| 2013/0114720 | A1 | 5/2013 | Wang et al. |
| 2014/0092967 | A1 | 4/2014 | Seregin et al. |
| 2017/0310990 | A1 | 10/2017 | Hsu |
| 2017/0332095 | A1 | 11/2017 | Zou et al. |
| 2018/0192047 | A1 | 7/2018 | Lv et al. |
| 2018/0270500 | A1 | 9/2018 | Li et al. |
| 2018/0359483 | A1 | 12/2018 | Chen et al. |
| 2019/0200023 | A1 | 6/2019 | Hanhart et al. |
| 2019/0246110 | A1 | 8/2019 | Xu et al. |
| 2019/0335170 | A1 | 10/2019 | Lee et al. |
| 2019/0373285 | A1 | 12/2019 | Vanam et al. |
| 2019/0387250 | A1 | 12/2019 | Boyce et al. |
| 2020/0045310 | A1 | 2/2020 | Chen et al. |
| 2020/0145688 | A1 | 5/2020 | Zou et al. |
| 2020/0213594 | A1 | 7/2020 | Liu et al. |
| 2020/0213612 | A1 | 7/2020 | Liu et al. |
| 2020/0359029 | A1 | 11/2020 | Liu et al. |
| 2020/0382771 | A1 | 12/2020 | Liu et al. |
| 2020/0382795 | A1 | 12/2020 | Zhang et al. |
| 2020/0396453 | A1 | 12/2020 | Zhang et al. |
| 2020/0396465 | A1 | 12/2020 | Zhang et al. |
| 2021/0127116 | A1* | 4/2021 | Chen .............. H04N 19/139 |
| 2021/0211647 | A1 | 7/2021 | Liu et al. |
| 2021/0211678 | A1 | 7/2021 | Liu et al. |

FOREIGN PATENT DOCUMENTS

| | | |
|---|---|---|
| CN | 107113442 A | 8/2017 |
| CN | 108432250 A | 8/2018 |
| KR | 20140095607 A | 8/2014 |
| WO | 2007029914 A1 | 3/2007 |
| WO | 2013106336 A2 | 7/2013 |
| WO | 2017076221 A1 | 5/2017 |
| WO | 2017204532 A1 | 11/2017 |
| WO | 2018101700 A1 | 6/2018 |
| WO | 2018169923 A1 | 9/2018 |

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chen et al. "CE4: Affine Merge Enhancement (Test 2.10)," Joint Video Experts Team (JVET) of ITU-T SG 16 WP 3 and ISO/IEC JTC 1/SC 29/WG 11, 11th Meeting: Ljubljana, SI, Jul. 10-18, 2018, document JVET-K0186, 2018.

Chien et al. "Sub-Block Motion Derivation for Merge Mode in HEVC," Proceedings of SPIE, Sep. 27, 2016, 9971:99711K1-7.

Han et al. "CE4.1.3: Affine Motion Compensation Prediction," Joint Video Exploration Team (JVET) of ITU-T SG 16 WP 3 and ISO/IEC JTC 1/SC 29/WG 11, 11th Meeting, Ljubljana, SI, Jul. 10-18, 2018, document JVET-K0337, 2018.

Han et al. "CE4.2.16: Sub-block Merge Candidates in BMS and JEM," Joint Video Exploration Team (JVET) of ITU-T SG 16 WP 3 and ISO/IEC JTC 1/SC 29/WG 11, 11th Meeting: Ljubljana, SI, Jul. 10-18, 2018, document JVET-K0338, 2018.

He et al. "Efficient Coding with Adaptive Motion Models," 23 Picture Coding Symposium, Apr. 2003, Saint Malo.

Heithausen et al. "Interprediction Using Estimation and Explicit Coding of Affine Parameters," Joint Video Exploration Team (JVET) of ITU-T SG 16 WP 3 and ISO/IEC JTC 1/SC 29/WG 11, 8th Meeting, Macao, CN, Oct. 18-24, 2017, document JVET-H0031, 2017.

JEM-7.0: https://jvet.hhi.fraunhofer.de/svn/svn_HMJEMSoftware/tags/ HM-16.6-JEM-7.0.

https://www.itu.int/rec/T-REC-H.265.

Leannec et al. "CE4 Related: Simplified Non-Sub-Blocks STMVP," Joint Video Experts Team (JVET) of ITU-T SG 16 WP 3 and ISO/IEC JTC 1/SC 29/WG 11, 12th Meeting, Macao, CN, Oct. 3-12, 2018. document JVET-L0207, 2018.

Sugio et al. "Parsing Robustness for Merge/AMVP," Joint Collaborative Team on Video Coding (JCT-VC) of ITU-T SG 16 WP3 and ISO/IEC JTC1/SC29/WG11 6th Meeting, Torino, IT, Jul. 14-22, 2011, document JCTVC-F470, 2011.

Wu et al. "Description of SDR Video Coding Technology by University of Science and Technology of China, Peking University, Harbin Institute of Technology, and Wuhan University (IEEE 1857.10 Study Group)," Joint Video Experts Team (JVET) of ITU-T SG 16 WP3 and ISO/IEC JTC 1/SC 29/WG 11 10th Meeting, San Diego, US, Apr. 10-20, 2018, document JVET-J0032, 2018.

Xiu et al. "CE4.2.5: Simplification on Advanced Temporal Motion Vector Prediction (ATMVP)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0341, 2018.

Ye et al. "CE4 Related: Reduce Line Buffer for Additional Merge Candidates," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0297, 2018.

Zhang et al. "CE4.2.14: Planar Motion Vector Prediction," Joint Video Experts Team (JVET) of ITU-T SG 16 WP 3 and ISO/IEC JTC 1/SC 29/WG 11, 11th Meeting: Ljubljana, SI, Jul. 10-18, 2018, Document JVET-K0135, 2018.

Zhou et al. "Spatial-Temporal Merge Mode (non-Subblock STMVP)," Joint Video Exploration Team (JVET) of ITU-T SG 16 WP 3 and ISO/IEC JTC 1/SC 29/WG 11 11th Meeting, Ljubljana, SI, Jul. 10-18, 2018, document JVET-K0532, 2018.

International Search Report and Written Opinion from International Patent Application No. PCT/IB2019/058020 dated Dec. 11, 2019 (15 pages).

International Search Report and Written Opinion from International Patent Application No. PCT/IB2019/058021 dated Dec. 11, 2019 (49 pages).

International Search Report and Written Opinion from International Patent Application No. PCT/IB2019/058022 dated Dec. 11, 2019 (15 pages).

International Search Report and Written Opinion from International Patent Application No. PCT/IB2019/058023 dated Feb. 3, 2020 (20 pages).

Non-Final Office Action from U.S. Appl. No. 17/207,173 dated Feb. 10, 2022.

Non-Final Office Action from U.S. Appl. No. 17/207,060 dated Oct. 4, 2021.

* cited by examiner

8-PARAMETER AFFINE MODE

CROSS-REFERENCE TO RELATED APPLICATIONS

This application is a continuation of International Application No. PCT/IB2019/058022, filed on Sep. 23, 2019 which claims the priority to and benefits of International Application No. PCT/CN2018/107166, filed on Sep. 23, 2018. All of the aforementioned patent applications are hereby incorporated by reference in their entireties.

TECHNICAL FIELD

This patent document relates to video coding techniques, devices and systems.

BACKGROUND

Motion compensation (MC) is a technique in video processing to predict a frame in a video, given the previous and/or future frames by accounting for motion of the camera and/or objects in the video. Motion compensation can be used in the encoding of video data for video compression.

SUMMARY

This document discloses methods, systems, and devices related to the use of affine motion compensation in video coding and decoding.

In one example aspect,

A method of video processing is disclosed. The method comprising: deriving, for a current block, a set of control point (CP) motion vectors (MV); determining a motion prediction model for the current block based on the set of CPMVs; and performing a conversion between the current block and a bitstream representation of the current block using the motion prediction model, wherein the motion prediction model is a 8-parameter affine prediction model.

In yet another representative aspect, a video processing apparatus is disclosed. The apparatus comprises a processor configured to implement the methods described herein.

In yet another representative aspect, the various techniques described herein may be embodied as a computer program product stored on a non-transitory computer readable media. The computer program product includes program code for carrying out the methods described herein.

In another example aspect, a video encoder apparatus comprises a processor and video processing circuitry configured to implement video coding methods.

In yet another representative aspect, a video decoder apparatus may implement a method as described herein.

In yet another aspect, the described methods may be embodied in the form of processor-executable code and stored on a computer-readable medium.

The details of one or more implementations are set forth in the accompanying attachments, the drawings, and the description below. Other features will be apparent from the description and drawings, and from the claims.

DETAILED DESCRIPTION

The present document provides several techniques that can be embodied into digital video encoders and decoders. Section headings are used in the present document for clarity of understanding and do not limit scope of the techniques and embodiments disclosed in each section only to that section.

In the present document, the term "video processing" may refer to video encoding, video decoding, video compression or video decompression. For example, video compression algorithms may be applied during conversion from pixel representation of a video to a corresponding bitstream representation or vice versa.

1. Summary

This patent document is related to video/image coding technologies.

Specifically, it is related to motion vector prediction in video/image coding. It may be applied to the existing video coding standard like HEVC, or the standard (Versatile Video Coding) to be finalized. It may be also applicable to future video/image coding standards or video/image codec.

2. Introduction

Figure 1:
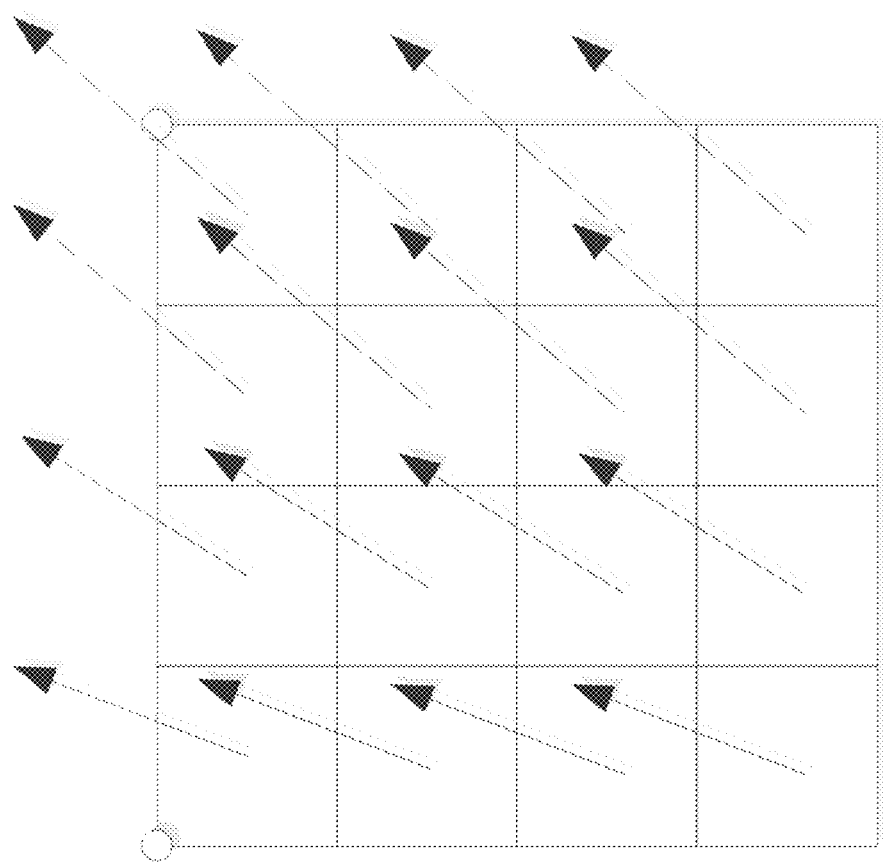
FIG. 1 shows an example of sub-block based prediction calculation.

Sub-block based prediction is first introduced into the video coding standard by HEVC Annex I (3D-HEVC). With sub-block based prediction, a block, such as a Coding Unit (CU) or a Prediction Unit (PU), is divided into several non-overlapped sub-blocks. Different sub-block may be assigned different motion information, such as reference index or Motion Vector (MV), and Motion Compensation (MC) is performed individually for each sub-block. FIG. 1 shows the concept of sub-block based prediction.

To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM).

In JEM, sub-block based prediction is adopted in several coding tools, such as affine prediction, Alternative temporal motion vector prediction (ATMVP), spatial-temporal motion vector prediction (STMVP), Bi-directional Optical flow (BIO) and Frame-Rate Up Conversion (FRUC). Affine prediction has also been adopted into VVC.

2.1 Affine Prediction

Figure 2A:
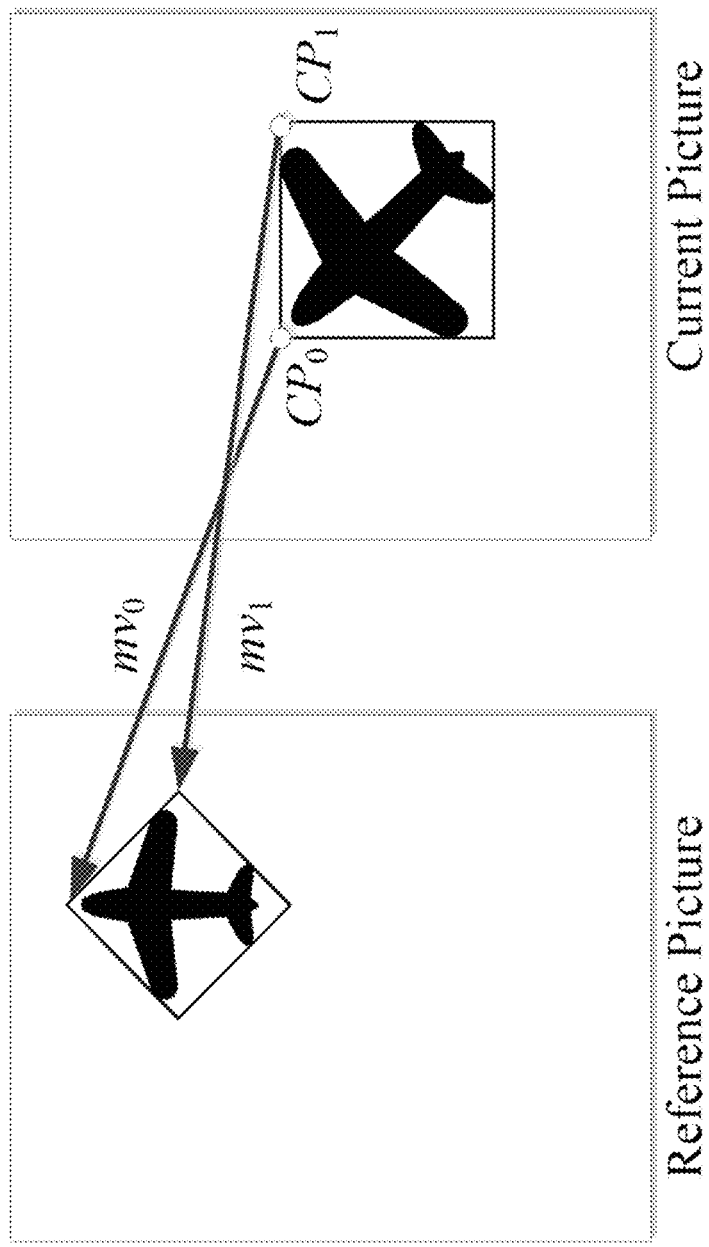
FIG. 2A-2B shows examples of Simplified affine motion model. (a) 4-parameter affine model; (b) 6-parameter affine model.
Figure 2B:
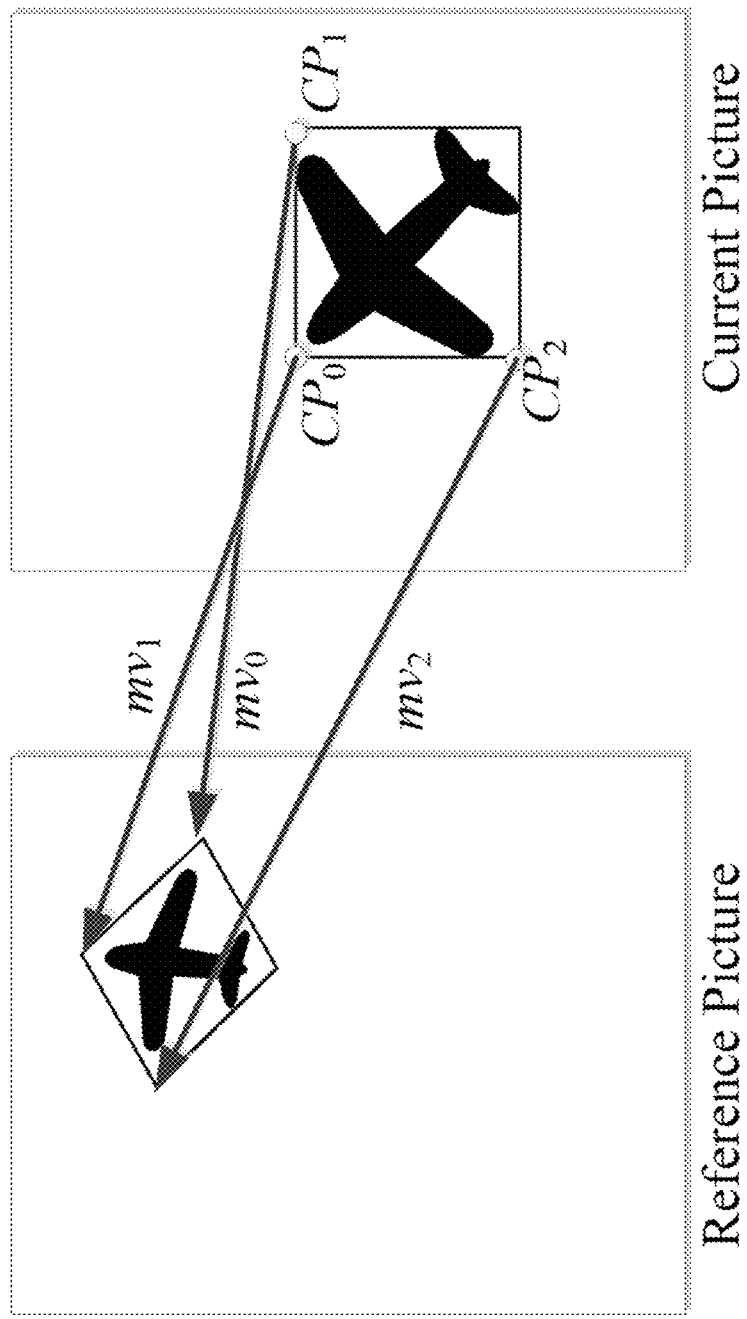

In HEVC, only translation motion model is applied for motion compensation prediction (MCP). While in the real world, there are many kinds of motion, e.g. zoom in/out, rotation, perspective motions and the other irregular motions. In the VVC, a simplified affine transform motion compensation prediction is applied. As shown in FIG. 2, the affine motion field of the block is described by two (in the 4-parameter affine model) or three (in the 6-parameter affine model) control point motion vectors.

FIG. 2 shows a simplified affine motion model. (a) 4-parameter affine model; (b) 6-parameter affine model The motion vector field (MVF) of a block is described by the following equation with the 4-parameter affine model $$\begin{cases} mv^h(x, y) = \frac{(mv_1^h - mv_0^h)}{w}x - \frac{(mv_1^v - mv_0^v)}{w}y + mv_0^h \\ mv^v(x, y) = \frac{(mv_1^v - mv_0^v)}{w}x + \frac{(mv_1^h - mv_0^h)}{w}y + mv_0^v \end{cases} \quad (1)$$

and 6-parameter affine model:

$$\begin{cases} mv^h(x, y) = \frac{(mv_1^h - mv_0^h)}{w}x + \frac{(mv_2^h - mv_0^h)}{h}y + mv_0^h \\ mv^v(x, y) = \frac{(mv_1^v - mv_0^v)}{w}x + \frac{(mv_2^v - mv_0^v)}{h}y + mv_0^v \end{cases} \quad (2)$$

where $(mv^h_0, mv^v_0)$ is motion vector of the top-left corner control point, and $(mv^h_1, mv^v_1)$ is motion vector of the top-right corner control point and $(mv^h_2, mv^v_2)$ is motion vector of the bottom-left corner control point.

Figure 3:
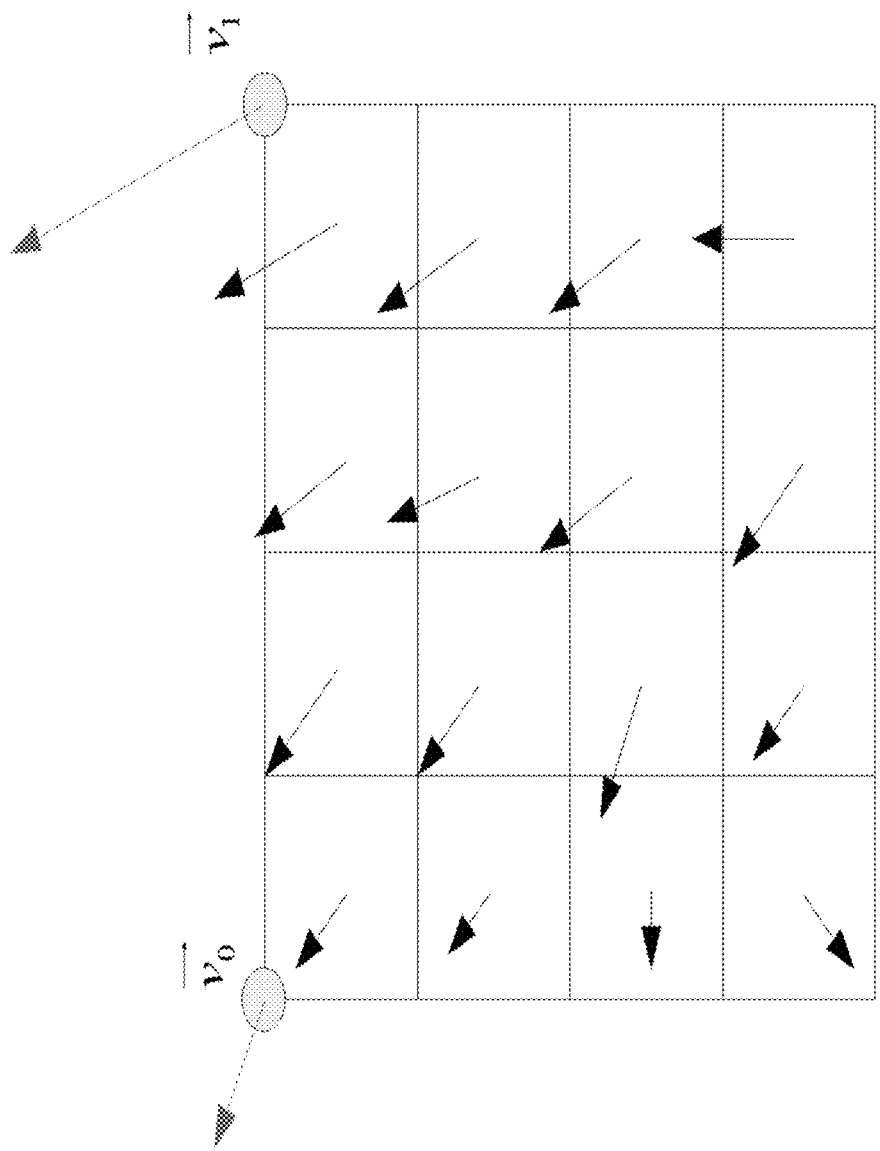
FIG. 3 shows an example of affine motion vector field (MVF) per subblock.

To derive motion vector of each 4×4 sub-block, the motion vector of the center sample of each sub-block, as shown in FIG. 3, is calculated according to Eq. (1) or (2), and rounded to 1/16 fraction accuracy. Then the motion compensation interpolation filters are applied to generate the prediction of each sub-block with derived motion vector.

In VTM, there are two affine motion modes: AF_INTER mode and AF_MERGE mode. For CUs with both width and height larger than 8, AF_INTER mode can be applied. An affine flag in CU level is signalled in the bitstream to indicate whether AF_INTER mode is used. In this mode, a CP MVP candidate list with two candidates is constructed.

Figure 4A:
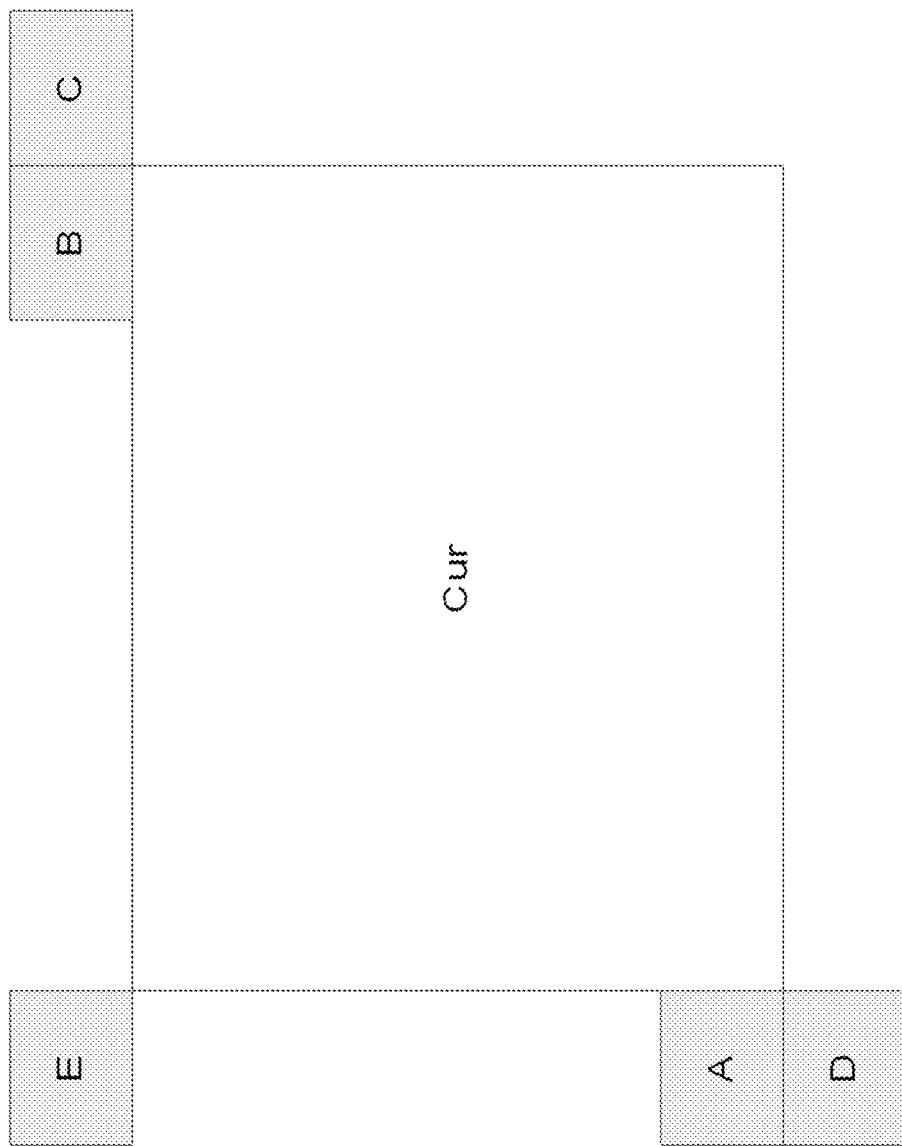
FIGS. 4A-4B show candidates for AF_MERGE mode.
Figure 4B:
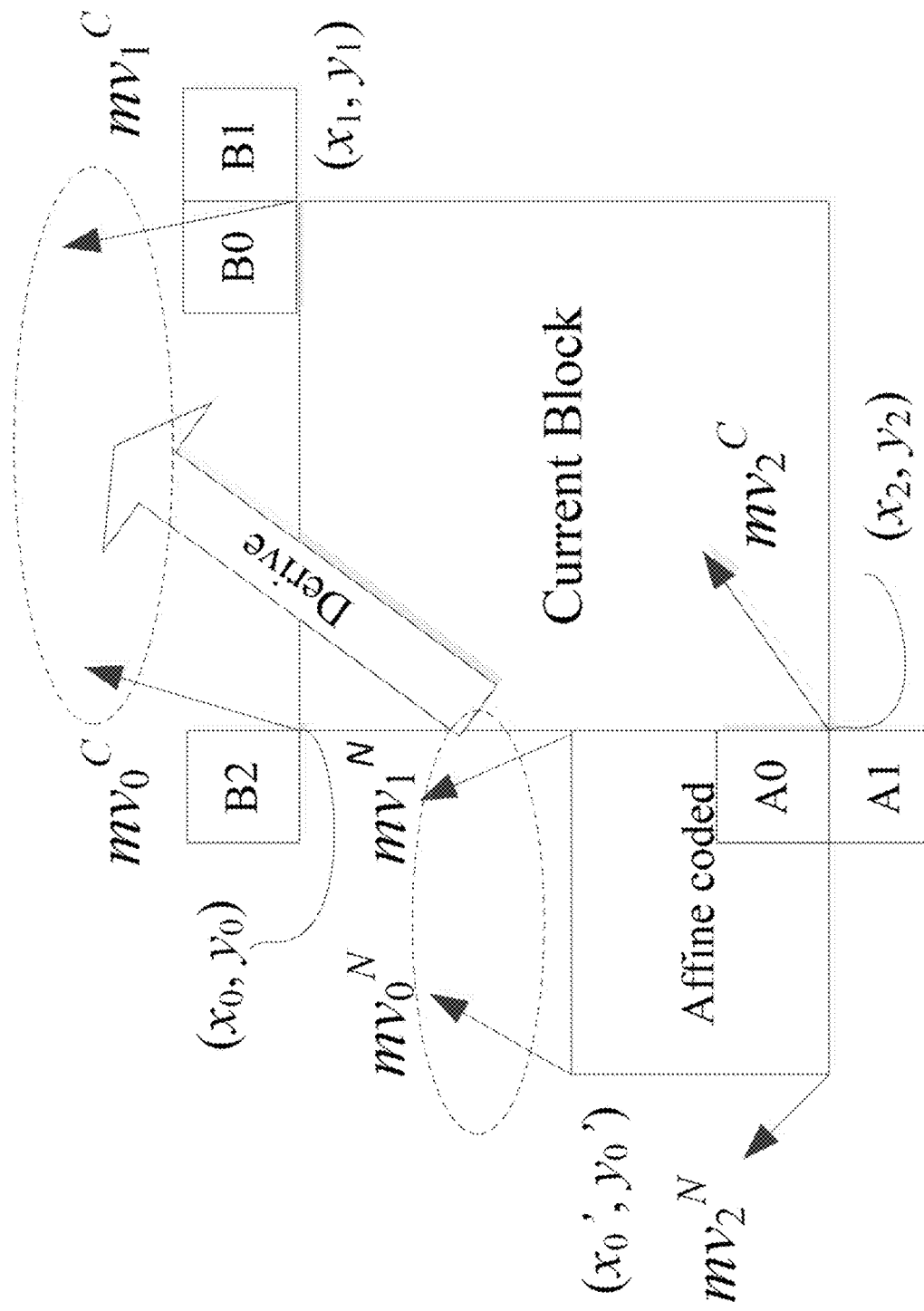

Affine model can be inherited from spatial neighbouring affine-coded block such as left, above, above right, left bottom and above left neighbouring block as shown in FIG. 4A. For example, if the neighbour left block A in FIG. 4A is coded in affine mode as denoted by A0 in FIG. 4B, the Control Point (CP) motion vectors $mv_0^N$, $mv_1^N$ and $mv_2^N$ of the top left corner, above right corner and left bottom corner of the neighbouring CU/PU which contains the block A are fetched. And the motion vector $mv_0^C$, $mv_1^C$ and $mv_2^C$ (which is only used for the 6-parameter affine model) of the top left corner/top right/bottom left on the current CU/PU is calculated based on $mv_0^N$, $mv_1^N$ and $mv_2^N$.

It should be noted that when a CU is coded with affine merge mode, i.e., in AF_MERGE mode, it gets the first block coded with affine mode from the valid neighbour reconstructed blocks. And the selection order for the candidate block is from left, above, above right, left bottom to above left as shown FIG. 4A.

The derived CP MVs $mv_0^C$, $mv_1^C$ and $mv_2^C$ of current block can be used as CP MVs in the affine merge mode. Or they can be used as MVP for affine inter mode in VVC. It should be noted that for the merge mode, if the current block is coded with affine mode, after deriving CP MVs of current block, the current block may be further split into multiple sub-blocks and each block will derive its motion information based on the derived CP MVs of current block.

2.2 JVET-K0186

Different from VTM wherein only one affine spatial neighboring block may be used to derive affine motion for a block, in JVET-K0186, it proposes to construct a separate list of affine candidates for the AF_MERGE mode.

1) Insert Inherited Affine Candidates into Candidate List

Figure 5:
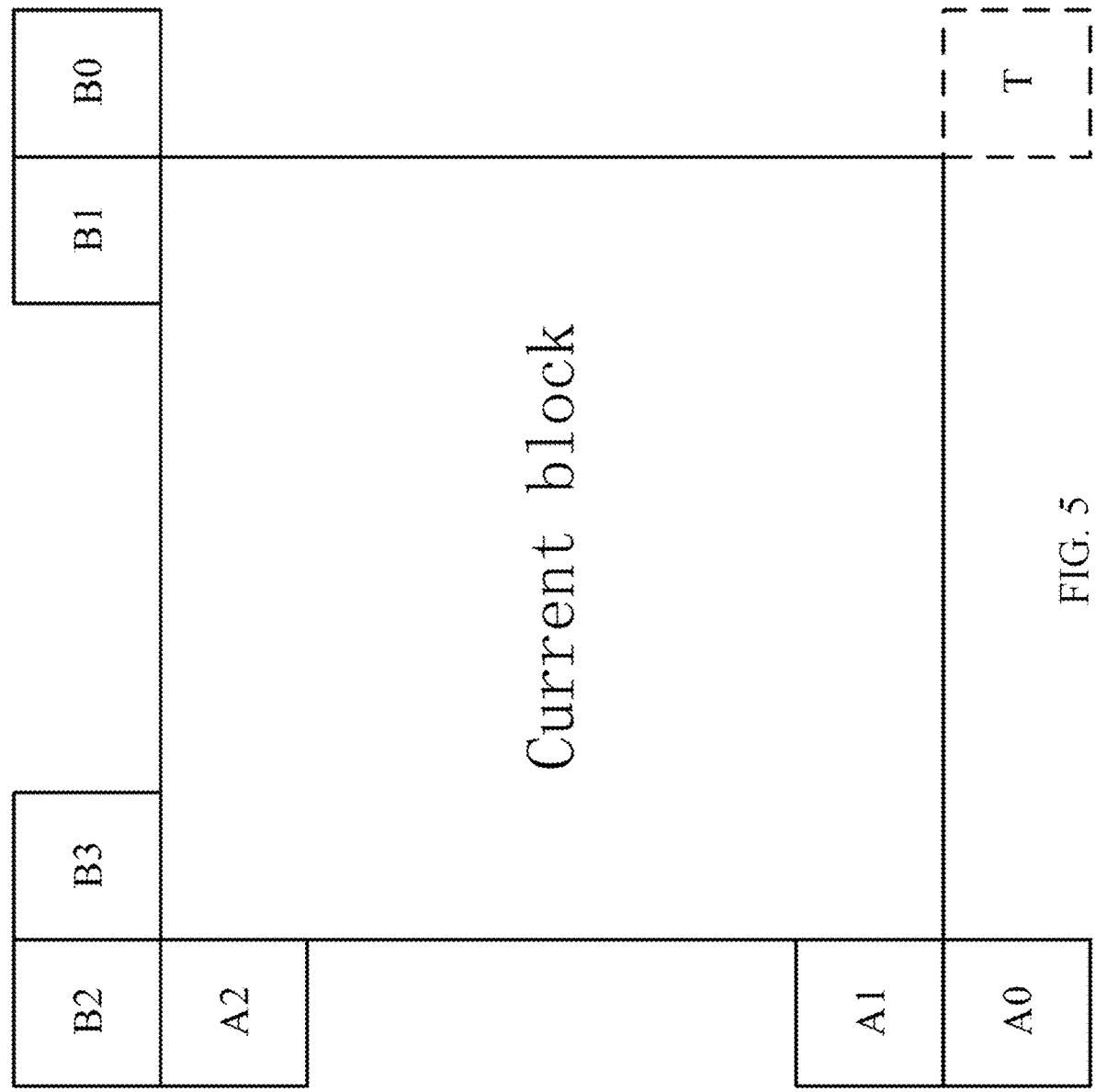
FIG. 5 shows example candidate positions for affine merge mode.

FIG. 5 shows examples of candidate position for affine merge mode.

Inherited affine candidate means that the candidate is derived from the valid neighbor reconstructed block coded with affine mode.

As shown in FIG. 5, the scan order for the candidate block is $A_1$, $B_1$, $B_0$, $A_0$ and $B_2$. When a block is selected (e.g., $A_1$), the two-step procedure is applied:
  a) Firstly, use the three corner motion vectors of the CU covering the block to derive two/three control points of current block
  b) Based on the control points of current block to derive sub-block motion for each sub-block within current block 2) Insert constructed affine candidates If the number of candidates in affine merge candidate list is less than MaxNumAffineCand, constructed affine candidates are insert into the candidate list.

Constructed affine candidate means the candidate is constructed by combining the neighbor motion information of each control point.

The motion information for the control points is derived firstly from the specified spatial neighbors and temporal neighbor shown in FIG. 5. CPk (k=1, 2, 3, 4) represents the k-th control point. $A_0$, $A_1$, $A_2$, $B_0$, $B_1$, $B_2$ and $B_3$ are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:
  For CP1, the checking priority is $B_2 \to B_3 \to A_2$. $B_2$ is used if it is available. Otherwise, if $B_2$ is unavailable, $B_3$ is used. If both $B_2$ and $B_3$ are unavailable, $A_2$ is used. If all the three candidates are unavailable, the motion information of CP1 cannot be obtained.
  For CP2, the checking priority is B1→B0;
  For CP3, the checking priority is A1→A0;
  For CP4, T is used.

Secondly, the combinations of controls points are used to construct the motion model.

Motion vectors of three control points are needed to compute the transform parameters in 6-parameter affine model. The three control points can be selected from one of the following four combinations ({CP1, CP2, CP4}, {CP1, CP2, CP3}, {CP2, CP3, CP4}, {CP1, CP3, CP4}). For example, use CP1, CP2 and CP3 control points to construct 6-parameter affine motion model, denoted as Affine (CP1, CP2, CP3).

Motion vectors of two control points are needed to compute the transform parameters in 4-parameter affine model. The two control points can be selected from one of the following six combinations ({CP1, CP4}, {CP2, CP3}, {CP1, CP2}, {CP2, CP4}, {CP1, CP3}, {CP3, CP4}). For example, use the CP1 and CP2 control points to construct 4-parameter affine motion model, denoted as Affine (CP1, CP2).

The combinations of constructed affine candidates are inserted into to candidate list as following order:

{CP1, CP2, CP3}, {CP1, CP2, CP4}, {CP1, CP3, CP4}, {CP2, CP3, CP4}, {CP1, CP2}, {CP1, CP3}, {CP2, CP3}, {CP1, CP4}, {CP2, CP4}, {CP3, CP4}

3) Insert zero motion vectors

If the number of candidates in affine merge candidate list is less than MaxNumAffineCand, zero motion vectors are insert into the candidate list, until the list is full.

2.3 ATMVP (Advanced Temporal Motion Vector Prediction)

At the 10th JVET meeting, advanced temporal motion vector prediction (ATMVP) was included in the benchmark set (BMS)-1.0 reference software, which derives multiple motion for sub-blocks of one coding unit (CU) based on the motion information of the collocated blocks from temporal neighboring pictures. Although it improves the efficiency of temporal motion vector prediction, the following complexity issues are identified for the existing ATMVP design:

The collocated pictures of different ATMVP CUs may not be the same if multiple reference pictures are used. This means the motion fields of multiple reference pictures need to be fetched.

The motion information of each ATMVP CU is always derived based on 4×4 units, resulting in multiple invocations of motion derivation and motion compensation for each 4×4 sub-block inside one ATMVP CU.

Some further simplifications on ATMVP were proposed and have been adopted in VTM2.0.

2.3.1 Simplified Collocated Block Derivation with One Fixed Collocated Picture

In this method, one simplified design is proposed to use the same collocated picture as in HEVC, which is signaled at the slice header, as the collocated picture for ATMVP derivation. At the block level, if the reference picture of a neighboring block is different from this collocated picture, the MV of the block is scaled using the HEVC temporal MV scaling method, and the scaled MV is used in ATMVP.

Denote the motion vector used to fetch the motion field in the collocated picture $R_{col}$ as $MV_{col}$. To minimize the impact due to MV scaling, the MV in the spatial candidate list used to derive $MV_{col}$ is selected in the following way: if the reference picture of a candidate MV is the collocated picture, this MV is selected and used as $MV_{col}$ without any scaling. Otherwise, the MV having a reference picture closest to the collocated picture is selected to derive $MV_{col}$ with scaling.

2.3.2 Adaptive ATMVP Sub-Block Size

In this method, it is proposed to support the slice-level adaptation of the sub-block size for the ATMVP motion derivation. Specifically, one default sub-block size that is used for the ATMVP motion derivation is signaled at sequence level. Additionally, one flag is signaled at slice-level to indicate if the default sub-block size is used for the current slice. If the flag is false, the corresponding ATMVP sub-block size is further signaled in the slice header for the slice.

2.4 STMVP (Spatial-Temporal Motion Vector Prediction)

Figure 6:
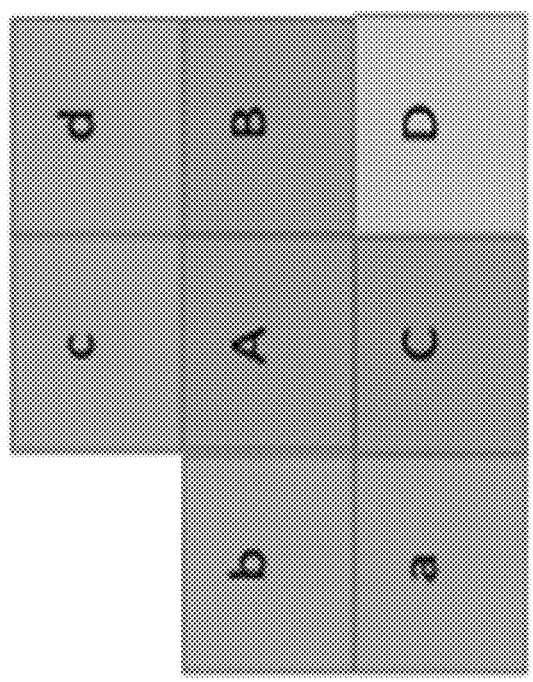
FIG. 6 shows an example of a Coding Unit (CU) with four sub-blocks (A-D) and its neighbouring blocks (a-d).

STMVP was proposed and adopted in JEM, but not in VVC yet. In STMVP, the motion vectors of the sub-CUs are derived recursively, following raster scan order. FIG. 6 illustrates this concept. Let us consider an 8×8 CU which contains four 4×4 sub-CUs A, B, C, and D. The neighbouring 4×4 blocks in the current frame are labelled as a, b, c, and d.

The motion derivation for sub-CU A starts by identifying its two spatial neighbours. The first neighbour is the N×N block above sub-CU A (block c). If this block c is not available or is intra coded the other N×N blocks above sub-CU A are checked (from left to right, starting at block c). The second neighbour is a block to the left of the sub-CU A (block b). If block b is not available or is intra coded other blocks to the left of sub-CU A are checked (from top to bottom, staring at block b). The motion information obtained from the neighbouring blocks for each list is scaled to the first reference frame for a given list. Next, temporal motion vector predictor (TMVP) of sub-block A is derived by following the same procedure of TMVP derivation as specified in HEVC. The motion information of the collocated block at location D is fetched and scaled accordingly. Finally, after retrieving and scaling the motion information, all available motion vectors (up to 3) are averaged separately for each reference list. The averaged motion vector is assigned as the motion vector of the current sub-CU.

FIG. 6 shows an example of one CU with four sub-blocks (A-D) and its neighbouring blocks (a-d).

2.5 Non-Sub Block STMVP

Figure 7:
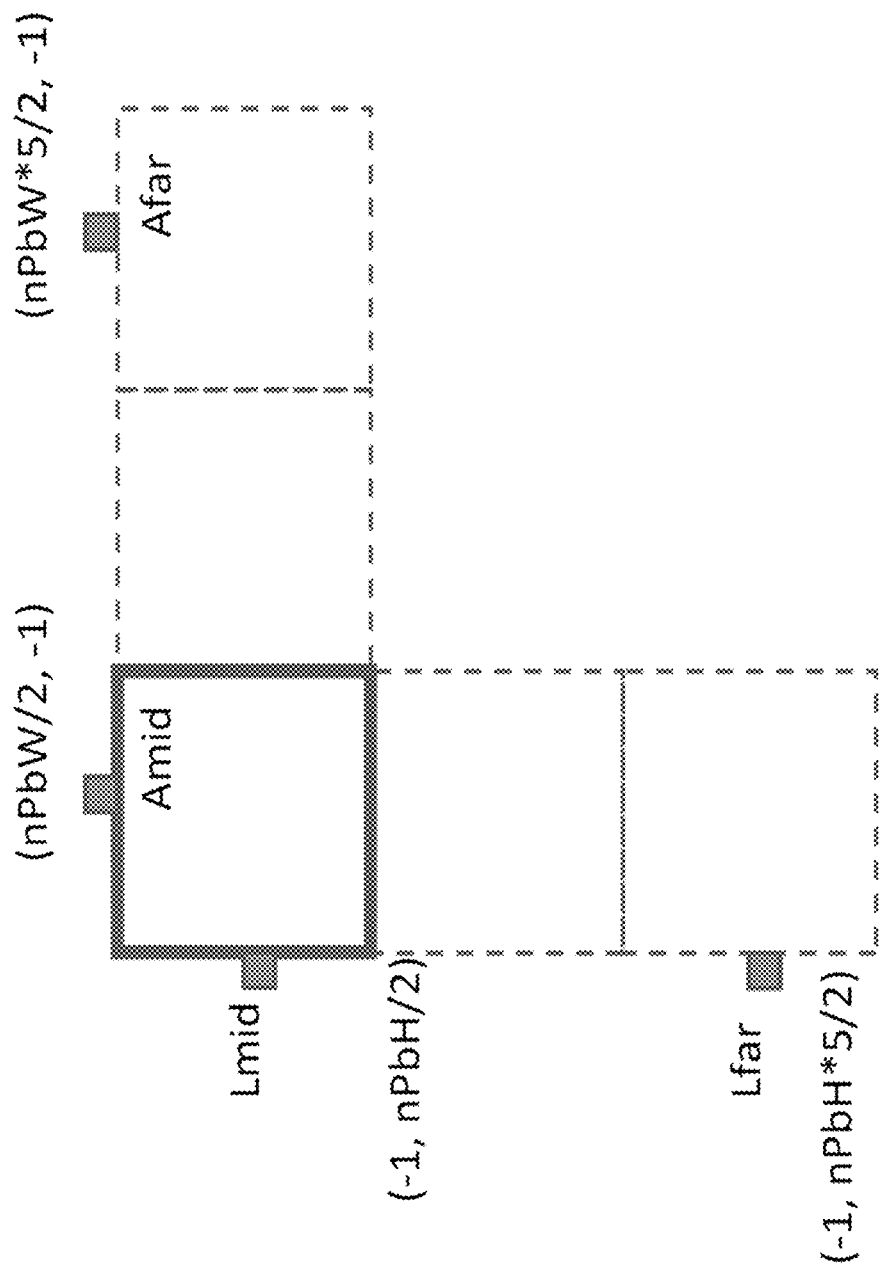
FIG. 7 illustrates an example of sub-block based spatio-temporal merge mode implementation.

In this proposal, non subblock STMVP is proposed as a spatial-temporal merge mode. This proposed method uses a collocated block, which is the same as HEVC/JEM (only 1 picture, no temporal vector here). The proposed method also checks upper and left spatial position, which position is adjusted in this proposal. Specifically to check neighbouring inter-prediction information, at most two positions is checked for each above and left. The exact position of Amid, Afar from above row, Lfar and Lmid from left column (as depicted in FIG. 7) is shown below:

Afar: (nPbW*5/2, −1), Amid (nPbW/2, −1)
Lfar: (−1, nPbH*5/2), Lmid (−1, nPbH/2)

An average of motion vectors of above block, left block and a temporal block is calculated as the same as BMS software implementation. If the 3 reference inter-prediction blocks is available, denoted the associated MVs by (mvLX_A[0], mvLX_A[1]), (mvLX_L[0], mvLX_L[1]) and (mvLX_C[0], mvLX_C[1]), respectively, and the final predictor is denoted by (mvLX[0], mvLX[1]).

$$mvLX[0]=((mvLX\_A[0]+mvLX\_L[0]+mvLX\_C[0])*43)/128$$

$$mvLX[1]=((mvLX\_A[1]+mvLX\_L[1]+mvLX\_C[1])*43)/128$$

If only two or one inter-prediction block is available, average of two or just use one my is used.

$$mvLX[0]=(mvLX\_D[0]+mvLX\_E[0])/2$$

$$mvLX[1]=(mvLX\_D[1]+mvLX\_E[1])/2$$

2.6 MV Planar

Figure 8:
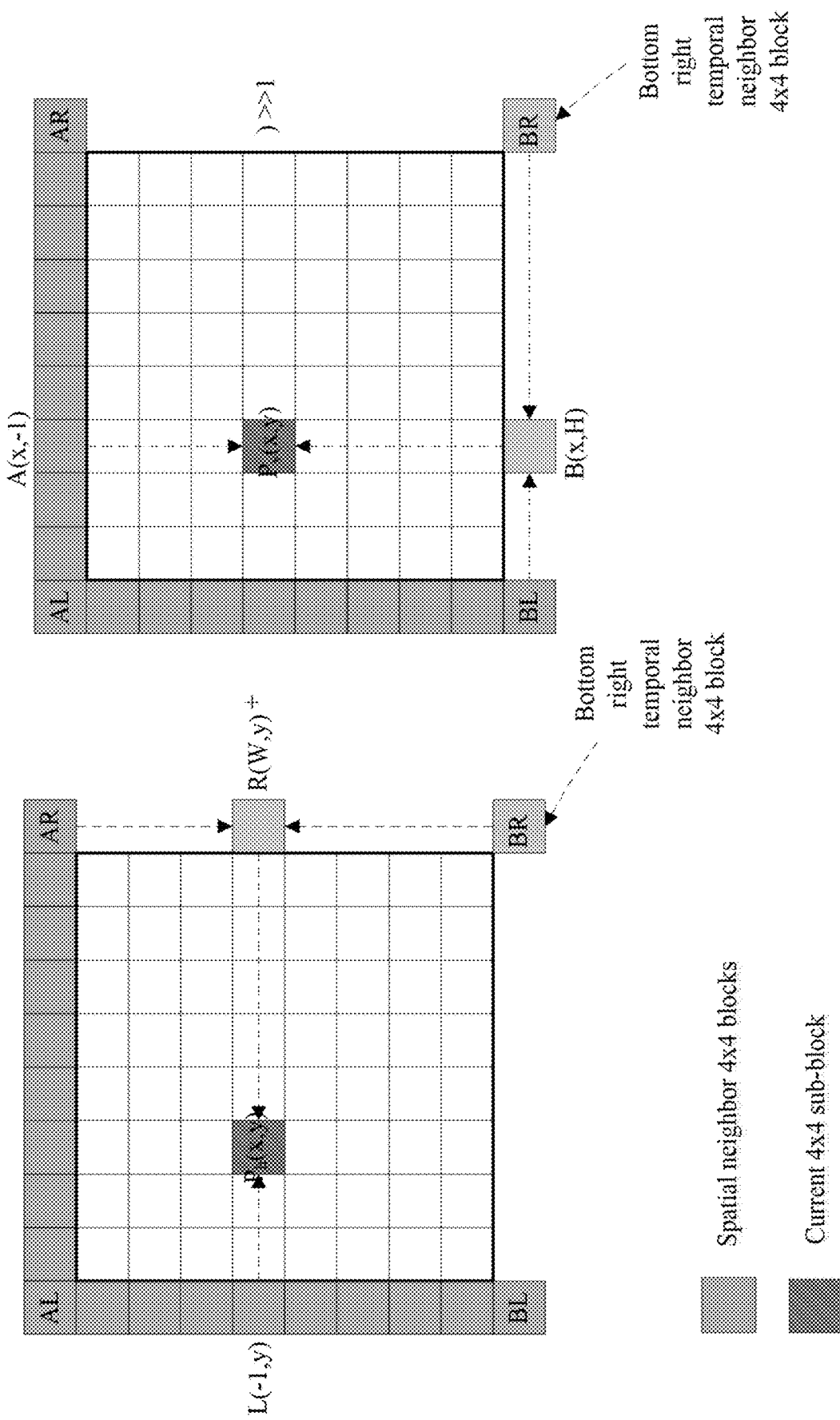
FIG. 8 illustrates an example of the planar motion vector prediction process.

To generate a smooth fine granularity motion field, FIG. 8 gives a brief description of the planar motion vector prediction process.

Planar motion vector prediction is achieved by averaging a horizontal and vertical linear interpolation on 4×4 block basis as follows.

$$P(x,y)=(H \times P_h(x,y)+W \times P_v(x,y)+H \times W)/(2 \times H \times W)$$

W and H denote the width and the height of the block. (x,y) is the coordinates of current sub-block relative to the above left corner sub-block. All the distances are denoted by the pixel distances divided by 4. P(x, y) is the motion vector of current sub-block.

The horizontal prediction $P_h(x, y)$ and the vertical prediction $P_v(x, y)$ for location (x,y) are calculated as follows:

$$P_h(x,y)=(W-1-x)\times L(-1,y)+(x+1)\times R(W,y)$$

$$P_v(x,y)=(H-1-y)\times A(x,-1)+(y+1)\times B(x,H)$$

where L(-1, y) and R(W, y) are the motion vectors of the 4×4 blocks to the left and right of the current block. A(x,-1) and B(x,H) are the motion vectors of the 4×4 blocks to the above and bottom of the current block.

The reference motion information of the left column and above row neighbour blocks are derived from the spatial neighbour blocks of current block.

The reference motion information of the right column and bottom row neighbour blocks are derived as follows.

Derive the motion information of the bottom right temporal neighbour 4×4 block

Compute the motion vectors of the right column neighbour 4×4 blocks, using the derived motion information of the bottom right neighbour 4×4 block along with the motion information of the above right neighbour 4×4 block, as described in Equation 1.

Compute the motion vectors of the bottom row neighbour 4×4 blocks, using the derived motion information of the bottom right neighbour 4×4 block along with the motion information of the bottom left neighbour 4×4 block, as described in Equation 2.

$$R(W,y)=((H-y-1)\times AR+(y+1)\times BR)/H \quad \text{Equation 1}$$

$$B(x,H)=((W-x-1)\times BL+(x+1)\times BR)/W \quad \text{Equation 2}$$

where AR is the motion vector of the above right spatial neighbour 4×4 block, BR is the motion vector of the bottom right temporal neighbour 4×4 block, and BL is the motion vector of the bottom left spatial neighbour 4×4 block.

The motion information obtained from the neighbouring blocks for each list is scaled to the first reference picture for a given list.

3. Problems

The current design of sub-block based prediction has the following problems:

The MV planar mode could bring additional coding gain at the cost of high computational complexity and memory bandwidth. For one aspect, it introduces sub-block motion which increases bandwidth. For another aspect, each sub-block need to derive its own motion.

The non-sub block STMVP design introduced division operations which is undesirable for hardware implementation.

The non-sub block STMVP design is only added as a special merge candidate. If it could also be utilized for inter mode, additional coding gain may be expected.

4. Example Techniques

The detailed inventions below should be considered as examples to explain general concepts. These inventions should not be interpreted in a narrow way. Furthermore, these inventions can be combined in any manner. Combination between this invention and other invention is also applicable.

Technique 1: Higher Coding Performance

1. The MV planar mode may be replaced by a single set of motion information assigned to a whole block instead of multiple sets of motion information assigned for each sub-block.
   a. In one example, the above neighboring blocks (e.g., AL and AR in FIG. 8) may be utilized to derive $1^{st}$ set of motion information located at the center position of current block. The bottom neighboring blocks (e.g., BL and BR in FIG. 8) may be utilized to derive $2^{nd}$ set of motion information located at the center position of current block. The final motion candidate for the current block is then derived from $1^{st}$ and $2^{nd}$ set of motion information.
   b. In one example, 6-parameter affine model (e.g., applied to AL, AR and BL) in FIG. 8) may be utilized to derive $1^{st}$ set of motion information located at the center position. The $1^{st}$ set of motion information and temporal motion information (e.g., motion associated with BR in FIG. 8) may be jointly utilized to derive the final motion candidate.
   c. In one example, some or all of the motion information pair (AL, AR), (AL, BL), (BL, BR), (AR, BR), (BL, AR) and (AL, BR) are used to derive several sets of 4-parameter affine model, which are then further used to derive the motion information located at the center position. These multiple sets of motion information may be jointly utilized to derive the final motion candidate.
      i. In one example, (AL, AR) and (BL, BR) are used to derive two sets of 4-parameter affine model.
   d. In one example, motion information of multiple spatial and temporal neighboring blocks may be utilized to derive one set of motion information, e.g., linear combination of all available motion information (e.g., after potential scaling to the same reference picture) associated with spatial/temporal neighboring blocks may be utilized to derive the final motion candidate.
2. A motion candidate derived jointly from spatial and temporal motion information may be added to the AMVP candidate list.
   a. In one example, given a target reference picture (which may be signaled in the bitstream), the MVs of spatial and temporal blocks may be firstly scaled to the target reference picture. The scaled MVs may be jointly used to derive a final motion vector predictor.
   b. In one example, the derivation process of using multiple MVs to form a final MV predictor is defined as a linear function.
      i. In one example, average of multiple MVs may be defined as the final MV predictor.
      ii. Alternatively, unequal weight may be applied to different MVs to form the final MV predictor.
3. Multiple motion candidates derived from above methods may be added to motion candidate lists.
   a. For each of the multiple motion candidate, different spatial or temporal block may be utilized.
   b. In one example, the two or more MV used to generate the derived motion candidate must refer to the same reference picture;
   c. In one example, the two or more MV used to generate the derived motion candidate must refer to reference pictures in the same reference list;
   d. In one example, the two or more MV used to generate the derived motion candidate must refer to a reference picture with the same reference index in the same reference list;
   e. In one example, the two or more MV used to generate the derived motion candidate may refer to different reference pictures.
      i. In one example, they will be scaled to the same reference picture.
      ii. In one example, they will be scaled to reference picture closest to the current picture.

4. Selection of spatial neighboring blocks in above proposed methods may be fixed, or be adaptively changed.
   a. In one example, selection of spatial neighboring blocks may depend on block size, and/or block shape.
   b. In one example, selection of spatial neighboring blocks may depend on coded mode (affine, non-affine, amvp or merge, slice type, etc. al).
   c. In one example, selection of spatial neighboring blocks may depend on inter-prediction direction (L0, L1 or Bi)
5. It is proposed to use the same collocated picture as used in TMVP and/or ATMVP design, which is signaled at the slice header, as the target picture where MVs are scaled to for STMVP derivation.
   a. At the block level, if the reference picture of a neighboring block is different from this collocated picture, the MV of the block is scaled, e.g., using the HEVC temporal MV scaling method, and the scaled MV is used in STMVP motion derivation process.
   b. Alternatively, the target picture is determined by the first available merge candidate.
   c. Alternatively, the target picture is determined as the reference picture closest to the current picture.
   d. Alternatively, for one reference picture list, the collocated picture may be used as a target picture for one reference picture list, and for the other reference picture list, the same reference picture associated with one of spatial neighboring block may be chosen.
6. With above methods, maximum number of candidates to be added to a candidate list and/or what kind of inserting order to the candidate list may be pre-defined.
   a. Alternatively, it may be dependent on coded mode (e.g., AMVP or merge; affine or non-affine).
   b. Alternatively, it may be dependent on coded block size/block shape/slice type.
   c. It may be signaled in in SPS, PPS, VPS, slice header/tile header, ect. al.
7. 8-parameter affine mode is proposed that 4 control points MVs are required for one affine model.
   a. In one example, in addition to the three CP used in 6-parameter affine model (e.g., CP0, CP1, and CP2 in FIG. 1), one more CP associated with the bottom-right position of the current block is further involved.
      i. In one example, the temporal motion information from one or multiple temporal neighboring block(s) may be used as a predictor for the bottom-right CP of the current block.
   b. In one example, for the AMVP mode, 4 MVDs may be signaled. Alternatively, furthermore, prediction between these 4 MVDs may be applied.
   c. In one example, the CP MV associated with the bottom-right CP is stored even the motion information used in motion compensation may be different.

Complexity Reduction

8. It is proposed to only access blocks for the sub-block STMVP and/or non-sub block STMVP or other kinds of motion candidates located at certain positions.
   a. In one example, the position of a neighboring block (x,y) should satisfy that x % M=0 and y % N=0 wherein M and N are two non-zero integers, such as M=N=8 or 16, 32 or 64.
   b. In one example, if the top-left sample in one neighboring block doesn't satisfy the given conditions, the checking of the motion information associated with this block is skipped. Therefore, the associated motion information couldn't be added to the merge candidate list.
   c. Alternatively, if the top-left sample in one neighboring block doesn't satisfy the given conditions, the position of this block may be shifted, truncated or rounded to make sure the conditions are satisfied. For example, (x, y) may be modified to ((x/M)*M, (y/N)*N) wherein '/' is the integer division.
   d. A restricted region size covering all the neighboring blocks is pre-defined/signaled. In this case, when a neighboring block calculated by a given offset (OffsetX, OffsetY) is outside the region, it is marked as unavailable or treated as intra-code mode. The corresponding motion information could not be utilized to generate a motion candidate to the candidate list.
      i. In one example, the region size is defined as one CTB, or multiple CTBs
      ii. In one example, the region size is defined as W*H (e.g., W=64 and H=64). Alternatively, furthermore, all neighbouring blocks with coordinator (NAx, NAy) should satisfy at least one of the following conditions:

$$NAx >= ((Cx/W)*W) \quad\quad 1)$$

$$NAx <= ((Cx/W)*W)+W. \quad\quad 2)$$

$$NAy >= ((Cy/H)*H) \quad\quad 3)$$

$$NAy <= ((Cy/H)*H)+H. \quad\quad 4)$$

wherein '>=' and/or '<=' in above functions may be replaced by '>' and/or '<', and function '/' indicates the integer division operations wherein the fractional part of the division results is discarded.
      iii. Alternatively, all blocks above the LCU row covering the current block are marked as unavailable or treated as intra-code mode. The corresponding motion information could not be utilized to generate a motion candidate to the candidate list.
      iv. Alternatively, suppose the top-left sample coordinate of the LCU covering current block by (LX, LY). (LX−NAx) and/or abs(LX−NAx) and/or (LY−NAy) and/or abs(LY−NAy) should be within a threshold.
         1. One or multiple thresholds may be predefined. They could be further dependent on minimum size of CU height/minimum size of width/LCU size etc., al. For example, (LY-NAy) should be less than the minimum size of CU height, or (LY−NAy) should be less than twice of the minimum size of CU height.
      v. The region size or the threshold(s) may be signaled in SPS, PPS, VPS, slice header/tile header, ect. al.
      vi. In one example, all neighbouring blocks outside the current slice/tile/other kinds of unit for parallel coding are marked as unavailable, and the corresponding motion information could not be utilized to derive a candidate to the candidate list.
9. Division operations of calculating the average of 2 or 3 or more motion vectors is replaced by shift operations.
   a. Average of three MVs:

$$mvLX[0]=((mvLX\_A[0]+mvLX\_L[0]+mvLX\_C[0])*S+W)>>N$$

$$mvLX[1]=((mvLX\_A[1]+mvLX\_L[1]+mvLX\_C[1])*S+W)>>N$$

For example, S=43 W=64 and N=7.
   b. Average of two MVs:

$$mvLX[0]=((mvLX\_A[0]+mvLX\_L[0]+1))>>1$$

$$mvLX[1]=((mvLX\_A[1]+mvLX\_L[1]+1))>>1$$

c. Average of M MVs is calculated as:

$$mvLX[0] = \left(\left(\sum_{i=0}^{M-1} mvLXi[0]\right) * S + O\right) \gg N$$

$$mvLX[1] = \left(\left(\sum_{i=0}^{M-1} mvLXi[1]\right) * S + O\right) \gg N$$

wherein S and N may be designed differently for different M. For example, N can be 7, 8, 9, 10 etc.
  i. In one example, given N, S is chosen as the number that S/2^N is closest but smaller than or equal to 1/M.
  ii. In one example, given N, S is chosen as the number that S/2^N is closest but larger than or equal to 1/M.
  iii. In one example, if S/2^N is equal to 1/M, O is chosen as 1<<(N−1).
  iv. In one example, if S/2^N is smaller than 1/M, O is chosen to be larger than or equal to 1<<(N−1).
  v. In one example, if S/2^N is larger than 1/M, O is chosen to be smaller than or equal to 1<<(N−1).
d. Alternatively, average of M MVs is calculated as:

$$mvLX[0] = \text{sign}\left(\sum_{i=0}^{M-1} mvLXi[0]\right) * \left(\text{abs}\left(\sum_{i=0}^{M-1}[0]\right) * S + O\right) \gg N$$

$$mvLX[1] = \text{sign}\left(\sum_{i=0}^{M-1} mvLXi[1]\right) * \left(\text{abs}\left(\sum_{i=0}^{M-1}[1]\right) * S + O\right) \gg N$$

Figure 9:
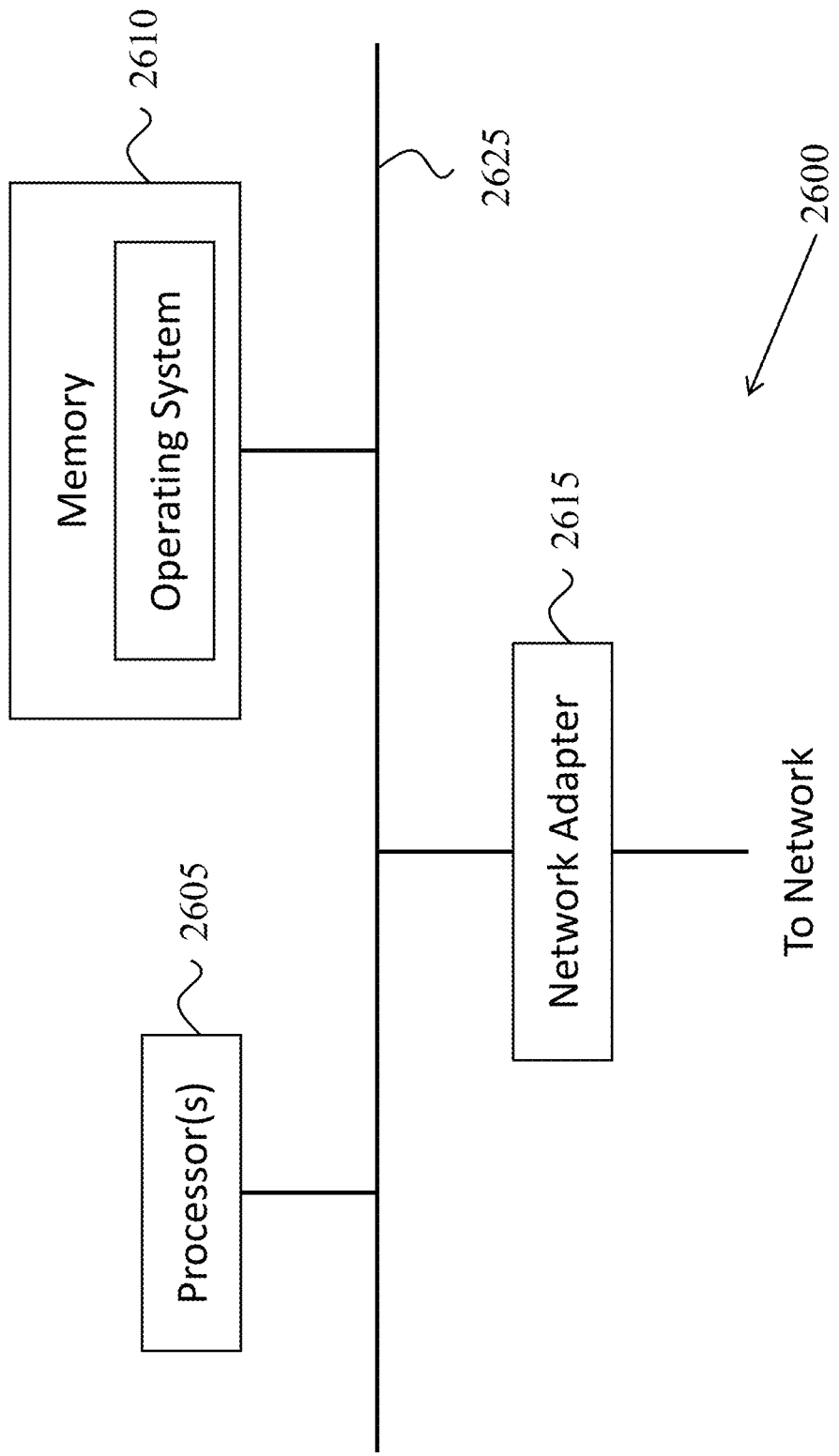
FIG. 9 is a block diagram illustrating an example of the architecture for a computer system or other control device that can be utilized to implement various portions of the presently disclosed technology.

FIG. 9 is a block diagram illustrating an example of the architecture for a computer system or other control device 2600 that can be utilized to implement various portions of the presently disclosed technology. In FIG. 9, the computer system 2600 includes one or more processors 2605 and memory 2610 connected via an interconnect 2625. The interconnect 2625 may represent any one or more separate physical buses, point to point connections, or both, connected by appropriate bridges, adapters, or controllers. The interconnect 2625, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 2605 may include central processing units (CPUs) to control the overall operation of, for example, the host computer. In certain embodiments, the processor(s) 2605 accomplish this by executing software or firmware stored in memory 2610. The processor(s) 2605 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 2610 can be or include the main memory of the computer system. The memory 2610 represents any suitable form of random access memory (RAM), read-only memory (ROM), flash memory, or the like, or a combination of such devices. In use, the memory 2610 may contain, among other things, a set of machine instructions which, when executed by processor 2605, causes the processor 2605 to perform operations to implement embodiments of the presently disclosed technology.

Also connected to the processor(s) 2605 through the interconnect 2625 is a (optional) network adapter 2615. The network adapter 2615 provides the computer system 2600 with the ability to communicate with remote devices, such as the storage clients, and/or other storage servers, and may be, for example, an Ethernet adapter or Fiber Channel adapter.

Figure 10:
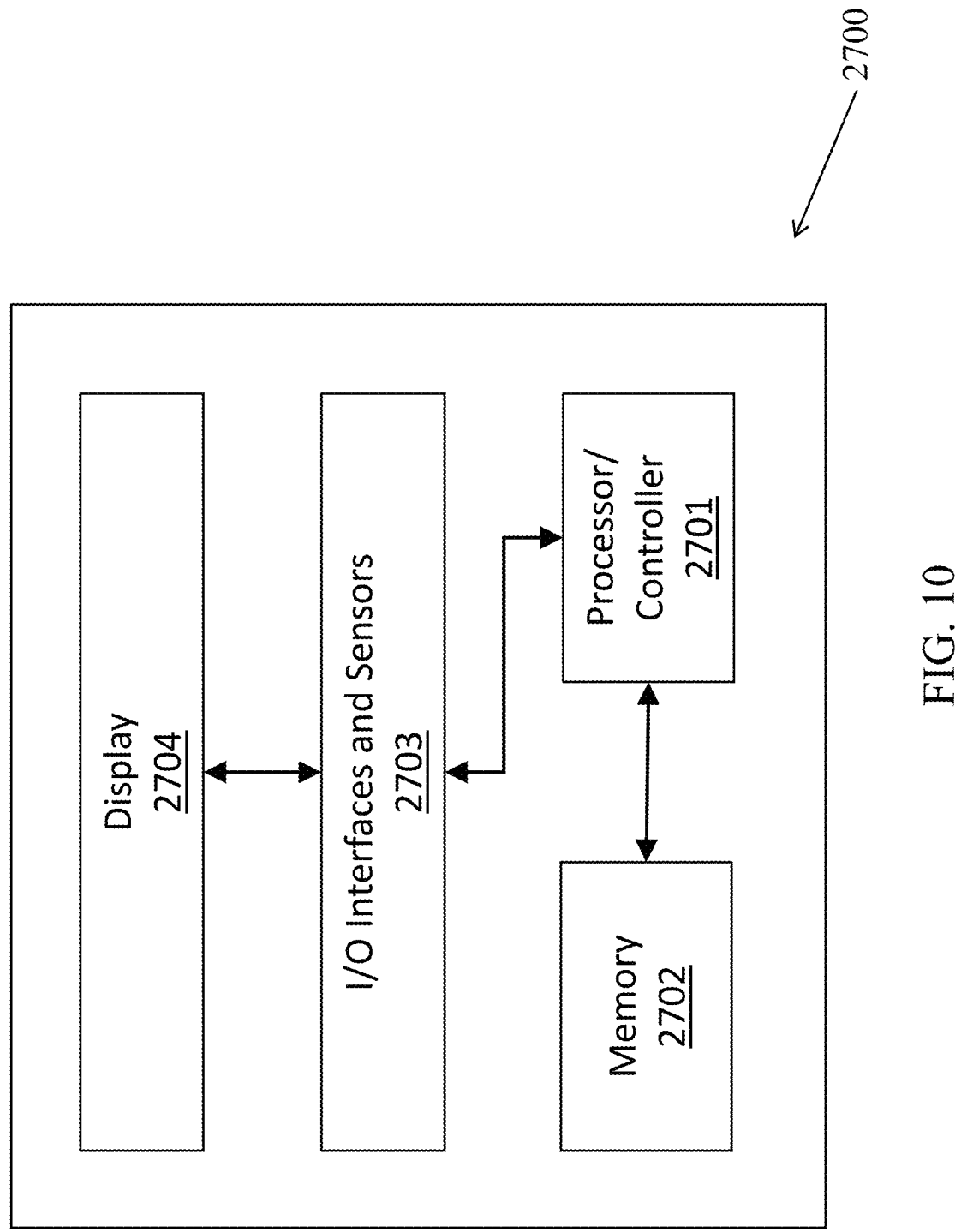
FIG. 10 shows a block diagram of an example embodiment of a mobile device that can be utilized to implement various portions of the presently disclosed technology.

FIG. 10 shows a block diagram of an example embodiment of a mobile device 2700 that can be utilized to implement various portions of the presently disclosed technology. The mobile device 2700 can be a laptop, a smartphone, a tablet, a camcorder, or other types of devices that are capable of processing videos. The mobile device 2700 includes a processor or controller 2701 to process data, and memory 2702 in communication with the processor 2701 to store and/or buffer data. For example, the processor 2701 can include a central processing unit (CPU) or a microcontroller unit (MCU). In some implementations, the processor 2701 can include a field-programmable gate-array (FPGA). In some implementations, the mobile device 2700 includes or is in communication with a graphics processing unit (GPU), video processing unit (VPU) and/or wireless communications unit for various visual and/or communications data processing functions of the smartphone device. For example, the memory 2702 can include and store processor-executable code, which when executed by the processor 2701, configures the mobile device 2700 to perform various operations, e.g., such as receiving information, commands, and/or data, processing information and data, and transmitting or providing processed information/data to another device, such as an actuator or external display. To support various functions of the mobile device 2700, the memory 2702 can store information and data, such as instructions, software, values, images, and other data processed or referenced by the processor 2701. For example, various types of Random Access Memory (RAM) devices, Read Only Memory (ROM) devices, Flash Memory devices, and other suitable storage media can be used to implement storage functions of the memory 2702. In some implementations, the mobile device 2700 includes an input/output (I/O) unit 2703 to interface the processor 2701 and/or memory 2702 to other modules, units or devices. For example, the I/O unit 2703 can interface the processor 2701 and memory 2702 with to utilize various types of wireless interfaces compatible with typical data communication standards, e.g., such as between the one or more computers in the cloud and the user device. In some implementations, the mobile device 2700 can interface with other devices using a wired connection via the I/O unit 2703. The mobile device 2700 can also interface with other external interfaces, such as data storage, and/or visual or audio display devices 2704, to retrieve and transfer data and information that can be processed by the processor, stored in the memory, or exhibited on an output unit of a display device 2704 or an external device. For example, the display device 2704 can display a video frame modified based on the MVPs in accordance with the disclosed technology.

Figure 11:
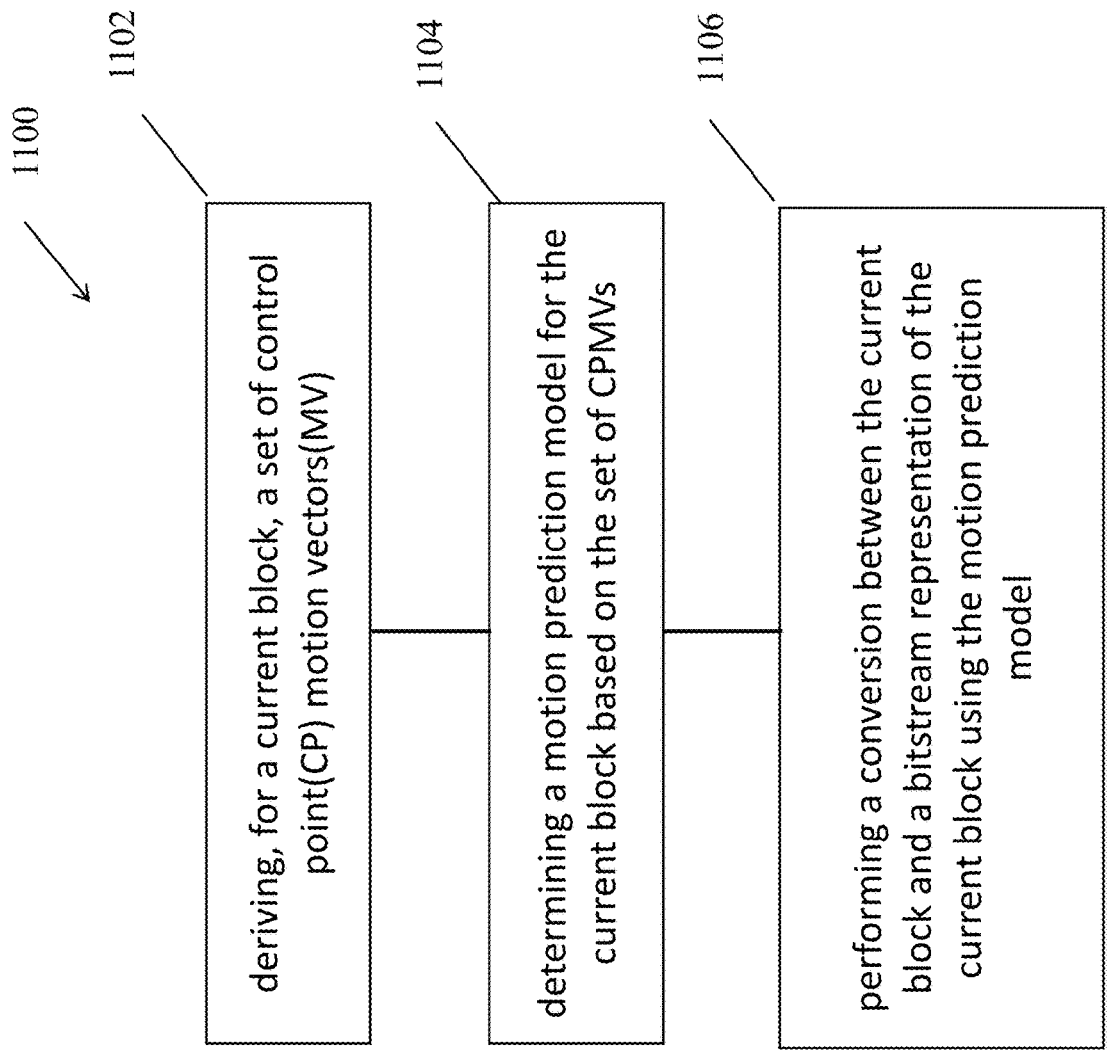
FIG. 11 is a flowchart for an example method of visual media processing.

FIG. 11 shows a flowchart for a method 1100 of video processing. The method 1100 includes deriving (1102), for a current block, a set of control point (CP) motion vectors (MV). The method further includes determining (1104) a motion prediction model for the current block based on the set of CPMVs. The method includes performing (1106) a conversion between the current block and a bitstream representation of the current block using the motion prediction model, wherein the motion prediction model is a 8-parameter affine prediction model.

In another example aspect, another method (the "AMVP method") of video coding is disclosed. The AMVP method includes determining, for a current block, an advanced motion vector prediction (AMVP) list, and performing conversion between the current block and a bitstream representation of the current block by determining a motion vector using the AMVP list. the AMVP list uses spatial and temporal motion information.

In yet another example aspect, another method (8-parameter affine method) of video coding is disclosed. The method includes performing conversion between the current block and a bitstream representation of the current block using an 8-parameter affine mode that uses 4 control point (CP) motion vectors (MV). The CPs are used based on a coding condition of the current block.

Various embodiments and techniques disclosed in the present document can be described in the following listing of examples.

1. A method of video processing, comprising: deriving, for a current block, a set of control point (CP) motion vectors (MV); determining a motion prediction model for the current block based on the set of CPMVs; and performing a conversion between the current block and a bitstream representation of the current block using the motion prediction model, wherein the motion prediction model is a 8-parameter affine prediction model.

2. The method of example 1, wherein the set of CPMVs comprises four CPMVs which are respectively associated with top-left, top-right, bottom-left and bottom-right corners of the current block.

3. The method of example 2, wherein the CPMV associated with the bottom-right corner of the current block is derived from one or more temporal neighboring blocks of the current block.

4. The method of example 2 or 3, wherein each of the CPMVs respectively associated with the top-left, top-right, and bottom-left corners of the current block is derived from one or more spatial neighboring blocks of the current block.

5. The method of any one of examples 1-4, wherein in an advanced motion vector prediction (AMVP) mode, four motion vector differences (MVD) which are associated with the four CPMVs respectively are signaled.

6. The method of example 5, wherein a prediction can be applied between the four MVDs.

7. The method of example 2 or 3, wherein the CPMV associated with the bottom-right corner of the current block is stored even if it is different from the motion information used in a motion compensation for the bottom-right corner.

8. The method of any one of examples 1-7, wherein the conversion comprises at least one of encoding the current block into the bitstream representation of the current block and decoding the current block from the bitstream representation of the current block.

9. A video processing apparatus comprising a processor configured to implement the method of any one of examples 1 to 8.

10. A computer program product stored on a non-transitory computer readable media, the computer program product including program code for carrying out the method in any one of examples 1 to 8.

With respect to the method 1100, the AMVP method and the 8-parameter affine mode method, additional examples of implementations and embodiments are provided in the Techniques described in Section 4 and the listing of claim attached herewith, which forms a part of the description.

In another example aspect, a video encoder apparatus comprises a processor and video processing circuitry configured to implement video coding methods.

In yet another representative aspect, a video decoder apparatus may implement a method as described herein.

In yet another aspect, the described methods may be embodied in the form of processor-executable code and stored on a computer-readable medium.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of video processing, comprising:
    deriving, for a current block of a video, a set of control point (CP) motion vectors (MV);
    determining a motion prediction model for the current block based on the set of CPMVs; and
    performing a conversion between the current block and a bitstream of the video using the motion prediction model,
    wherein the motion prediction model is an 8-parameter affine prediction model, and
    wherein the set of CPMVs comprises four CPMVs which are respectively associated with top-left, top-right, bottom-left and bottom-right corners of the current block.

2. The method of claim 1, wherein the CPMV associated with the bottom-right corner of the current block is derived from one or more temporal neighboring blocks of the current block.

3. The method of claim 1, wherein each of the CPMVs respectively associated with the top-left, top-right, and bottom-left corners of the current block is derived from one or more spatial neighboring blocks of the current block.

4. The method of claim 1, wherein in an advanced motion vector prediction (AMVP) mode, four motion vector differences (MVD) which are associated with the four CPMVs respectively are signaled.

5. The method of claim 4, wherein a prediction can be applied between the four MVDs.

6. The method of claim 1, wherein the CPMV associated with the bottom-right corner of the current block is stored even if it is different from the motion information used in a motion compensation for the bottom-right corner.

7. The method of claim 1, wherein the conversion includes encoding the current block into the bitstream.

8. The method of claim 1, wherein the conversion includes decoding the current block from the bitstream.

9. An apparatus for processing video data comprising a processor and a non-transitory memory with instructions thereon, wherein the instructions upon execution by the processor, cause the processor to:
    derive, for a current block of a video, a set of control point (CP) motion vectors (MV);
    determine a motion prediction model for the current block based on the set of CPMVs; and
    perform a conversion between the current block and a bitstream of the video using the motion prediction model,
    wherein the motion prediction model is an 8-parameter affine prediction model, and
    wherein the set of CPMVs comprises four CPMVs which are respectively associated with top-left, top-right, bottom-left and bottom-right corners of the current block.

10. The apparatus of claim 9, wherein the CPMV associated with the bottom-right corner of the current block is derived from one or more temporal neighboring blocks of the current block.

11. The apparatus of claim 9, wherein each of the CPMVs respectively associated with the top-left, top-right, and bottom-left corners of the current block is derived from one or more spatial neighboring blocks of the current block.

12. The apparatus of claim 9, wherein in an advanced motion vector prediction (AMVP) mode, four motion vector differences (MVD) which are associated with the four CPMVs respectively are signaled.

13. The apparatus of claim 12, wherein a prediction can be applied between the four MVDs.

14. The apparatus of claim 9, wherein the CPMV associated with the bottom-right corner of the current block is stored even if it is different from the motion information used in a motion compensation for the bottom-right corner.

15. The apparatus of claim 9, wherein the conversion includes encoding the current block into the bitstream.

16. The apparatus of claim 9, wherein the conversion includes decoding the current block from the bitstream.

17. A non-transitory computer-readable recording medium storing a bitstream of a video which is generated by a method performed by a video processing apparatus, wherein the method comprises:
    deriving, for a current block of the video, a set of control point (CP) motion vectors (MV);
    determining a motion prediction model for the current block based on the set of CPMVs; and
    generating the bitstream from the current block using the motion prediction model,
    wherein the motion prediction model is an 8-parameter affine prediction model, and
    wherein the set of CPMVs comprises four CPMVs which are respectively associated with top-left, top-right, bottom-left and bottom-right corners of the current block.

18. The non-transitory computer-readable recording medium of claim 17, wherein the CPMV associated with the bottom-right corner of the current block is derived from one or more temporal neighboring blocks of the current block.

19. The non-transitory computer-readable recording medium of claim 17, wherein each of the CPMVs respectively associated with the top-left, top-right, and bottom-left corners of the current block is derived from one or more spatial neighboring blocks of the current block.

20. The non-transitory computer-readable recording medium of claim 17, wherein in an advanced motion vector prediction (AMVP) mode, four motion vector differences (MVD) which are associated with the four CPMVs respectively are signaled.

* * * * *